United States Patent
Shimoda et al.

(10) Patent No.: US 8,567,703 B2
(45) Date of Patent: Oct. 29, 2013

(54) METHOD FOR PRODUCING HYDRAULIC POWDER

(75) Inventors: Masaaki Shimoda, Wakayama (JP);
Toshimasa Hamai, Wakayama (JP);
Makoto Okubo, Wakayama (JP);
Takeshi Tomifuji, Wakayama (JP);
Masato Nomura, Wakayama (JP)

(73) Assignee: Kao Corporation, Tokyo (JP)

( * ) Notice: Subject to any disclaimer, the term of this patent is extended or adjusted under 35 U.S.C. 154(b) by 344 days.

(21) Appl. No.: 13/001,634

(22) PCT Filed: Jul. 16, 2009

(86) PCT No.: PCT/JP2009/063227
§ 371 (c)(1),
(2), (4) Date: Dec. 28, 2010

(87) PCT Pub. No.: WO2010/008092
PCT Pub. Date: Jan. 21, 2010

(65) Prior Publication Data
US 2011/0100264 A1    May 5, 2011

(30) Foreign Application Priority Data

Jul. 18, 2008 (JP) ................................. 2008-187726

(51) Int. Cl.
*B02C 19/00* (2006.01)
*B02C 17/00* (2006.01)

(52) U.S. Cl.
USPC ........................................................ 241/22

(58) Field of Classification Search
USPC ........................................................ 241/22
See application file for complete search history.

(56) References Cited

U.S. PATENT DOCUMENTS

| | | | |
|---|---|---|---|
| 5,117,032 A | | 5/1992 | Fabry et al. |
| 5,125,976 A | * | 6/1992 | Skvara et al. ................. 106/724 |
| 5,573,589 A | | 11/1996 | Tanaka et al. |
| 2006/0272554 A1 | | 12/2006 | Jardine et al. |
| 2007/0221764 A1 | | 9/2007 | Tran et al. |
| 2011/0100266 A1 | * | 5/2011 | Hamai et al. .................. 106/809 |

FOREIGN PATENT DOCUMENTS

| | | |
|---|---|---|
| DE | 44 46 371 A1 | 6/1996 |
| EP | 0 390 220 A2 | 10/1990 |
| GB | 561997 A | 6/1944 |
| JP | 57-10092 A | 6/1982 |
| JP | 61-72664 A | 4/1986 |
| JP | 61-83659 A | 4/1986 |
| JP | 61-191547 A | 8/1986 |
| JP | 6-199557 A | 7/1994 |
| JP | 7-10624 A | 1/1995 |
| JP | 9-194244 A | 7/1997 |
| JP | 11-60298 A | 3/1999 |
| JP | 2000-103661 A | 4/2000 |
| JP | 2005-89287 A | 4/2005 |
| WO | WO 2006/132762 A2 | 12/2006 |
| WO | WO 2007/109328 A2 | 9/2007 |

OTHER PUBLICATIONS

Notification of the 2nd Office Action for corresponding Chinese Patent Application No. 200980128091.4, dated Dec. 4, 2012.
Supplementary European Search Report for corresponding European Patent Application No. 09798016.3, dated Nov. 30, 2012.
International Search Report, dated Sep. 15, 2009, issued in corresponding International Application PCT/JP2009/063227.
A Chinese Office Action, dated Aug. 8, 2012, for Chinese Application No. 200980128091.4 is provided, including English translation thereof.
International Preliminary Report on Patentability and English translation of the Written Opinion of the International Searching Authority dated Feb. 8, 2011 for Application No. PCT/JP2009/063227(PCT/IB/373 and PCT/ISA/237).
Notification of the 3rd Office Action for corresponding Chinese Patent Application No. 200980128091.4, dated Mar. 21, 2013.

* cited by examiner

*Primary Examiner* — Faye Francis

(74) *Attorney, Agent, or Firm* — Birch, Stewart, Kolasch & Birch, LLP

(57) ABSTRACT

The present invention produces the hydraulic powder through grinding of the hydraulic compound in the presence of a compound (a) prepared by reacting (A) at least one compound selected from polyhydric alcohols and alkylene oxide adducts thereof with (B) a sulfating agent.

3 Claims, No Drawings

METHOD FOR PRODUCING HYDRAULIC POWDER

FIELD OF THE INVENTION

The present invention relates to a method for producing a hydraulic powder, including grinding a hydraulic compound.

BACKGROUND OF THE INVENTION

Various hydraulic powders are produced by pulverizing hydraulic compounds such as Portland cement clinker and blast furnace slag. For example, Portland cement is produced by preparing clinker by burning raw materials such as limestone, clay, iron slag, adding an adequate amount of gypsum to the clinker, and pulverizing the mixture. In the production, to increase a pulverization efficiency, grinding aids such as diethylene glycol and triethanolamine are used. In pulverization, a hydraulic compound is desirably pulverized into a desired particle size as efficient as possible. Thus, grinding aids conventionally have been used in pulverization.

Examples of the grinding aid include oligomers of lower alkylene glycols such as propylene glycol and diethylene glycol, alkanolamines such as triethanolamine, fatty acids such as stearic acid, aromatic compounds such as phenol, hydroxyalkylhydrazine, and t-butylacetic acid. Those have also been known, including use of glycerol as a grinding aid (see, for example, JP-A 11-60298), combination use of lignosulfonate and glycerol (see, for example, JP-A 57-100952), and use of an organic factory waste liquid containing a polyhydric alcohol (see, for example, JP-A 2005-89287). In particular, diethylene glycol and triethanolamine are said to have good pulverization efficiency and be capable of pulverizing into a desired particle size at a relatively fast rate.

SUMMARY OF THE INVENTION

The present invention relates to a method for producing a hydraulic powder, including grinding a hydraulic compound in the presence of (a) a compound prepared by reacting component (A) of at least one compound selected from polyhydric alcohols and alkylene oxide adducts thereof (hereinafter, referred to as component (A)) with a sulfating agent (B) (hereinafter, referred to as component (B)).

The present invention also relates to a hydraulic powder produced by the above shown method of the present invention.

DETAILED DESCRIPTION OF THE INVENTION

Diethylene glycol, which has been widely used as a grinding aid for hydraulic compounds, has to be used with consideration for effects on safety and health, and is a substance largely constrained in use. Triethanolamine is designated as a Class II substance in the sense of "The Law on the Prohibition of Chemical Weapons and the Regulation of Specific Chemicals," and could be subjected to restriction of use in the future. Therefore, there is a need for discovery of an alternative substance.

The present invention provides a method for producing a hydraulic powder, that can ensure safety of a grinding aid, has a good grinding efficiency to shorten a time taking to achieve a desired particle size, and can produce the hydraulic powder such as a cement that enhances strength of a resultant hydraulic composition.

According to the present invention, provided is a method for producing a hydraulic powder, that can ensure safety of a grinding aid, has a good grinding efficiency to shorten a time taking to achieve a desired particle size, and can produce the hydraulic powder such as a cement that enhances strength of a resultant hydraulic composition.

In general, grinding of a hydraulic compound, such as cement clinker, causes intergranular fracture and transgranular fracture. Transgranular fracture cleaves an ion bonding of Ca—O to give a surface on which a positive ion ($Ca^{2+}$) presents excessively and a surface on which a negative ion ($O^{2-}$) presents excessively. These surfaces are compressed into a distance exerting an electrostatic attractive force each other by an impact behavior of a grinder to agglomerate (agglomeration). This is thought to be the reason of a decreased grinding efficiency. A grinding aid is considered to increase a grinding efficiency by reducing a surface energy of a particle breakage surface and controlling agglomeration.

In the present invention, the hydraulic compound can be ground into a desired particle size for a short time in the presence of the compound (a) in grinding the hydraulic compound. Details of a mechanism are still unknown, but it is presumed that a mono-molecular layer of the compound (a) is formed on a substance to be ground even in a relatively small amount and an increased grinding efficiency is achieved.

It is also presumed that the resultant hydraulic powder has the strongly hydrophilic surface and can be finely dispersed in water without forming retained water in kneading, and thus does not inhibit hydration, resulting in increased strength.

The number of hydroxy groups in the polyhydric alcohol of component (A) is preferably not less than 2 and not more than 20. The polyhydric alcohol having not less than 2 hydroxy groups provides the compound (a) sufficiently exhibiting its function. The polyhydric alcohol having not more than 20 hydroxy groups provides the compound (a) having an adequate molecular weight and exhibiting its function with a small addition amount. The number of hydroxy groups of the compound (A) is preferably not more than 10, and more preferably not more than 6. That is, the number of hydroxy groups of component (A) is preferably 2 to 20, more preferably 2 to 10, and even more preferably 2 to 6.

In component (A), the number of carbon atoms of the polyhydric alcohol is not less than 2, preferably not less than 3, and more preferably not less than 4. The number of carbon atoms of the compound (A) is also preferably not more than 30, more preferably not more than 14, and even more preferably not more than 9. In a preferred embodiment of the compound (A), the polyhydric alcohol does not contain nitrogen and is obtained from a compound constructed with three elements, carbon, hydrogen and oxygen. That is, in component (A), the number of carbon atoms of the polyhydric alcohol is preferably 2 to 30, more preferably 3 to 14, even more preferably 4 to 14, and even preferably 4 to 9.

Preferred examples of the polyhydric alcohol include polyvinyl alcohols (hydroxy group number: 3 to 20), polyglycidols (hydroxy group number: 3 to 20), ethylene glycol, diethylene glycol, triethylene glycol, propylene glycol, dipropylene glycol, polyethylene glycol, polypropylene glycol, 1,4-butanediol, 1,6-hexanediol, glycerol, diglycerol, polyglycerol (hydroxy group number: 5 to 20), trimethylolethane, trimethylolpropane, 1,3,5-pentanetriol, erythritol, pentaerythritol, dipentaerythritol, sorbitol, sorbitan, sorbitol-glycerol condensates, adonitol, arabitol, xylitol and mannitol. Examples of a sugar preferably used include hexoses such as glucose, fructose, mannose, idose, sorbose, gulose, talose, tagatose, galactose, allose, psicose and altrose; pentoses such as arabinose, ribulose, ribose, xylose, xylulose and lyxose; tetroses such as threose, erythrulose and erythrose; and other sugars such as rhamnose, cellobiose, maltose, isomaltose, trehalose, sucrose, raffinose, gentianose and melezitose. Sugar alcohols and sugar acids derived therefrom (sugar; glucose, sugar alcohol; glucit, sugar acid; gluconic acid) are also preferably included. Further, alkylene oxide adducts, partially etherified products and partially esterified products of these compounds are also preferably included (however, they must have two or more hydroxy groups). These may be used alone or in combination of two or more. In the present invention, among them, preferred polyhydric alcohols are diethylene glycol, glycerol and multimers thereof including diethylene glycol, polyglycerol, diglycerol, and glycerol, more preferred are diethylene glycol and glycerol, and even more preferred is glycerol.

An alkylene oxide to a polyhydric alcohol (a polyhydric alcohol-alkylene oxide) (hereinafter, referred to as AO) adduct can be used as component (A). AO is at least one compound selected from ethylene oxide (hereinafter, referred to as EO) and propylene oxide (hereinafter, referred to as PO). The polyhydric alcohol-AO adduct is preferably selected from compounds added with ED in an average amount of 0.5 to 6 mol, more preferably 0.5 to 3 mol.

From the viewpoints of reducing a surface energy of a particle breakage surface and an increased grinding efficiency, the compound (a) is preferably prepared by reacting (sulfating) component (A) with component (B) in an average amount of 0.1 to 1.0 mol, more preferably 0.1 to 0.9 mol, even more preferably 0.1 to 0.7 mol, and even more preferably 0.1 to 0.4 mol per mole of hydroxy group of component (A). Component (B) can be any compound that is used as a sulfating agent. Examples of the compound include sulfuric anhydride such as $SO_3$ gas and liquid $SO_3$, sulfuric acid, fuming sulfuric acid, chlorosulfonic acid, and sulfuric anhydride/Lewis base complex. Among them, preferred for component (B) is one or more compounds selected from $SO_3$ gas and liquid $SO_3$. A reacted amount of component (B) per mole of hydroxy group of component (A) can be calculated from each mole number of the components (A) and (B) used in the reaction, the number of hydroxy groups in component (A) and a concentration of sodium sulfate in the resultant compound (a) (the mole number of sodium sulfate that has not reacted with component (A)).

In the present invention, component (A) is preferably at least one compound selected from diethylene glycol, glycerol, glycerol-EO adducts and glycerol-PO adducts, and more preferably selected from glycerol, glycerol-EO adducts and glycerol-PO adducts. Component (A) is even more preferably a compound selected from glycerol and glycerol-EO adducts having an average addition mole number of 0.5 to 6. The glycerol-EO adduct preferably has an average addition mole number of EO of 0.5 to 3, more preferably 0.5 to 1.5.

In the present invention, the compound (a) is preferably a compound (a1) prepared by reacting at least one compound selected from (A1) glycerol and (A2) glycerol-EO adducts and glycerol-PO adducts as component (A) with component (B) in an average amount of 0.1 to 1.0 mol, more preferably 0.1 to 0.9 mol, even more preferably 0.1 to 0.7 mol, and even more preferably 0.1 to 0.4 mol per mole of hydroxy group in the selected compound(s) (hereinafter, referred to as the compound (a-1)). The compound (a1) can be used as the grinding aid for hydraulic compounds.

In sulfation of component (A) with component (B), an index, a sulfation ratio is used. A sulfation ratio represents a ratio of sulfation of hydroxy group in component (A). For example, a sulfation ratio of glycerol is 3.0 at the maximum. When an average two of three hydroxy groups in glycerol, an average one of three, and an average 0.5 of three are sulfated, sulfation ratios are 2.0, 1.0, and 0.5, respectively. The compound (a) preferably has a sulfation ratio of 0.2 to 20.0, more preferably 0.2 to 14.0, even more preferably 0.2 to 10.0, and even more preferably 0.2 to 8.0 to provide a hydraulic powder having a hydrophilic surface. When component (A) is glycerol or a glycerol-alkylene oxide adduct, the compound (a) preferably has a sulfation ratio of 0.2 to 2.5, and more preferably 0.2 to 2.0. When component (A) is diethylene glycol, the compound (a) preferably has a sulfation ratio of 0.2 to 1.5, and more preferably 0.2 to 1.0. When component (A) is at least one compound selected from components (A1) and (A2), the compound (a) preferably has a sulfation ratio of 0.2 to 2.5, and more preferably 0.2 to 2.0. A sulfation ratio can be calculated from each mole number of the components (A) and (B) used in the reaction and a concentration of sodium sulfate in the resultant compound (a) (the mole number of sodium sulfate that has not reacted with component (A)).

The compound (a) is preferably prepared by reacting component (A) with component (B) in an average amount of 0.2 to 8.0 mol, more preferably 0.3 to 3.0 mol per 1.0 mol of component (A). Component (A) is preferably at least one component selected from components (A1) and (A2). When component (A) is at least one component selected from components (A1) and (A2), the compound (a) is preferably prepared by reacting component (A) with component (B) in an amount of 0.3 to 2.0 mol.

The compound (a) is prepared by reacting component (A) with component (B). The production of the compound (a) can be performed according to known methods. Examples of component (B) include sulfuric anhydride such as $SO_3$ gas and liquid $SO_3$, sulfuric acid, fuming sulfuric acid, chlorosulfonic acid, and sulfuric anhydride/Lewis base complex. Preferred are sulfuric anhydride such as $SO_3$ gas and liquid $SO_3$ and fuming sulfuric acid. Example of a method for sulfation include liquid phase processes such as of using a large excess amount of sulfuric acid, of using chlorosulfonic acid and of using sulfuric anhydride and gas-liquid mixed processes such as of using gaseous sulfuric anhydride diluted in an inert gas (preferably using a thin-film-type sulfating reactor). From the viewpoint of control of generation of by-products, preferred are gas-liquid mixed processes. From the viewpoint of less amount of impurities and good economic potential, more preferred is a gas-liquid mixed process using gaseous sulfuric anhydride diluted in an inert gas.

The compound (a) is a sulfation product of component (A) and generally contains a sulfate ester of component (A) (partial sulfate ester and/or full sulfate ester). In some cases, the compound (a) contains unreacted component (A). In the present invention, a reaction product mixture containing the compound (a) prepared by reacting component (A) with component (B) can be used. In this case, component (A) is preferably reacted with component (B) in such amount as a sulfation ratio of the reaction product mixture is within the range described above. For increasing solubility in water, the compound (a) can be used in the form of salt. Examples of the salt include monovalent salts such as a sodium salt and a potassium salt. The compound (a) having increased solubility in water can provide an aqueous solution thereof that is easy to handle.

Portland cement is generally produced by burning a raw material, such as limestone, clay or iron slag, to produce clinker, which is a hydraulic compound, also referred to as cement clinker, optionally containing gypsum, then pregrinding the obtained clinker, adding an adequate amount of gypsum thereto and finish-grinding the mixture to obtain a powder having a specific surface area of a Blaine value of not less than 2500 $cm^2/g$. The compound (a) of the present invention is used as a grinding aid in grinding the hydraulic compound, preferably the clinker, and more preferably as a grinding aid in the main grinding. From the viewpoint of grinding into a desired particle size in a short time, the compound (a) is preferably used, on solid base, in an amount of 0.001 to 0.2 part by weight, and more preferably 0.005 to 0.1 part by weight to 100 parts by weight of the hydraulic compound such as a cement clinker as a raw material to be ground. The compound (a) is preferably added to the raw material containing the hydraulic compound such as clinker to be ground. Examples of a method of addition include dropping and spraying a liquid of the compound (a) or a liquid mixture of the compound (a) with other ingredient. A content of solids can be determined by introducing about 3 g of a reaction mixture of component (A) with component (B) (when neutralized, an aqueous solution of a neutralized product) into an aluminium foil cup, weighing it, drying it for 2 hours at 105° C., weighing it again and calculating a difference between the weights measured before and after drying.

From the viewpoint of ease of handle, the compound (a) may be in the form of aqueous solution. In this case, a concentration of the compound (a) is preferably 40 to 99% by weight.

The "hydraulic compound" refers a substance having properties of curing by reacting with water or a substance not curing alone but forming a hydrate in combination of two or more use thereof by interaction via water to cure. In general, alkaline-earth oxides and polyvalent oxides such as $SiO_2$, $Al_2O_3$, $TiO_2$, $P_2O_5$ and $ZnO$ form a hydrate at ambient temperature or under hydrothermal conditions. Examples of the hydraulic compound include a blast furnace slag and clinker. In the present invention, the hydraulic compound is preferably a cement clinker.

In the present invention, conditions for grinding may be appropriately controlled to produce a powder having an adequate particle size according to a raw material, an intended use, and the like. In general, the hydraulic compound such as clinker is preferably ground into a powder having a specific surface area, a Blaine value, of 2500 to 5000 $cm^2/g$, and more preferably 3000 to 4000 $cm^2/g$. An intended Blaine value can be achieved by, for example, controlling a grinding time. A longer grinding time tends to provide a powder having a higher Blaine value, and a shorter time tends to a lower Blaine value.

In the present invention, any grinding apparatus can be used for grinding the hydraulic compound without specific limitation. Examples of the grinding apparatus include a ball mill widely used in grinding a cement. A material of a grinding medium (grinding balls) of the apparatus desirably has a hardness equal to or higher than that of a substance to be ground (for example, calcium aluminate in cases of a cement clinker). Examples of a commercial product commonly available include steel, stainless steel, alumina, zirconia, titania and tungsten carbide.

The compound (a) of the present invention can be used as a grinding aid for grinding a hydraulic compound, is excellent in safety, has good grinding efficiency, and can increase strength of a concrete.

The compound (a), particularly the compound (a1) of the present invention is preferably used as a grinding aid for hydraulic compounds, particularly for clinkers. In other words, the present invention provides a method for grinding a hydraulic compound using the compound (a), particularly the compound (a1) as a grinding aid. When the compound (a1) is used, an amount thereof is, on solid bases, preferably 0.001 to 0.2 part by weight, more preferably 0.005 to 0.1 part by weight, and even more preferably 0.02 to 0.06 part by weight to 100 parts by weight of a hydraulic compound, particularly clinker.

The grinding aids of the present invention may be used in combination of two or more thereof and together with other grinding aid. For example, the other grinding aid may be used in an amount of not more than 40% by weight of the total amount of grinding aids. Known grinding aids including diethylene glycol and triethanolamine may be used. From the viewpoint of safety, naturally occurred grinding aids including glycerol, glycerol-EO adducts, and glycerol-PO adducts may also be used. In the present invention, the other grinding aid is preferably at least one compound selected from diethylene glycol, glycerol, glycerol-EO adducts and glycerol-PO adducts. When using a known grinding aid, preferably at least one compound selected from diethylene glycol, glycerol, EO adducts to glycerol and PO adducts to glycerol, as the other grinding aid (X), a weight ratio of the compound (a) to the other grinding aid (X) is preferably (a)/(X)=99/1 to 50/50, and more preferably 99/1 to 70/30. Thus, a weight ratio of the compound (a) to the other grinding aid (X) is, combined with the case of the compound (a) used alone, (a)/(X)=100/0 to 50/50, and preferably 100/0 to 70/30.

A hydraulic powder produced by the method of the present invention has increased strength. Examples of the hydraulic powder include Portland cement, blast furnace slag, alumina cement, fly ash, limestone and gypsum. Hydraulic compounds to be ground are raw materials for these hydraulic powders.

In the present invention, when a hydraulic compound contains a cement clinker, the amount ratio on bases of the hydraulic compound may be represented on bases of the cement clinker. For example, an amount to 100 parts by weight of hydraulic compound may be represented as an amount to 100 parts by weight of cement clinker in the hydraulic compound. When a hydraulic compound is a cement clinker, the cement clinker is preferably 100 parts by weight. When a hydraulic compound is a mixed cement containing a cement clinker and slug, a total amount of the cement clinker and the slug is preferably 100 parts by weight.

EXAMPLES

The following Examples demonstrate the present invention. Examples are intended to illustrate the present invention, and not to limit the present invention.

Example 1 and Comparative Example 1

The raw materials in amounts described below were used. These were charged in a ball mill all at once and ground. Grinding efficiencies (times to reach a ground state) and strength tests of resultant cements were evaluated as follows. The results are shown in Table 1.

(1-1) Material Used clinker: clinker (passing through a sieve of 3.5 mm) for ordinary Portland cement prepared by mixing raw materials including limestone, clay, silica, a source of iron oxide, and the like so as to contain about 65% of CaO, about 22% of $SiO_2$, about 5% of $Al_2O_3$, about 3% of $Fe_2O_3$, about 3% of MgO and the like (on bases of weight), burning the mixture, and grinding it with a crusher and a grinder gypsum dihydrate: gypsum dihydrate containing 44.13% of $SO_3$ grinding aid: see Table 1 and Preparation Examples below

Preparation Example 1

Preparation of Sulfated Diethylene Glycol [Compound (a) in Example 1-1] (Sulfation Ratio: 1.0)

A thin-film sulfation reactor (inner diameter: 14 mmϕ, length: 4 m) was used to sulfate diethylene glycol under conditions of an $SO_3$ concentration of about 1% by volume (diluted with the dry air), a reaction molar ratio [$SO_3$/diethylene glycol] of 1.0 and a temperature of 34 to 64° C. An $SO_3$ gas was used as a sulfating agent. 268.7 g of the resultant sulfated product (acid value: 310.8 mgKOH/g) was added to 985.3 g of aqueous solution of 10.3% by weight sodium hydroxide. The pH of the resultant aqueous solution was adjusted to give an aqueous solution of sulfated diethylene glycol [a compound (a) in Example 1-1] (sulfation ratio: 1.0). The pH of the aqueous solution was 12.1, a volatile matter content was 70.5% by weight, and sodium sulfate was 0.1% by weight or less. Infrared absorption spectroscopy for non-volatile matter showed an absorption associated with a sulfate ester bond at 1224 $cm^{-1}$.

In the Example, an $SO_3$ gas was prepared according to the following operations. Sulfur was heated to melt, mixed with the dried air without moisture, and then burned to give sulfur dioxide ($SO_2$). The resultant sulfur dioxide was mixed with the dried air, passed through a tube filled with an oxidizing catalyst (vanadium oxide) to produce an $SO_3$ gas at a concentration of about 5% by volume. To the $SO_3$ gas was added the dried air to produce an $SO_3$ gas at a concentration of about 1% by volume.

Preparation Example 2

Preparation of Sulfated Glycerol [Compound (a) in Examples 1-2 and 1-8] (Sulfation Ratio: 0.9)

A thin-film sulfation reactor (inner diameter: 14 mmϕ, length: 4 m) was used to sulfate glycerol under conditions of an $SO_3$ concentration of about 1% by volume (diluted with the dry air), a reaction molar ratio [$SO_3$/glycerol] of 0.89 and a temperature of 47 to 68° C. A sulfating agent used was an $SO_3$ gas similarly prepared to in Preparation Example 1. 268.7 g of the resultant sulfated product (acid value: 290.3 mgKOH/g) was added to 713.3 g of aqueous solution of 8.5% by weight sodium hydroxide. The pH of the resultant aqueous solution was adjusted to give an aqueous solution of a sulfated glycerol [compound (a) in Example 1-2] (sulfation ratio: 0.9). The pH of the aqueous solution was 8.7, a volatile matter content was 65.3% by weight, and sodium sulfate was 0.5% by weight. Infrared absorption spectroscopy for nonvolatile matter showed an absorption associated with a sulfate ester bond at 1213 $cm^{-1}$. A composition of the sulfated glycerol was determined from a ratio of integration values of peaks of a proton nuclear magnetic resonance spectrum as follows: glycerol: 18.5%, glycerol-1-monosulfate: 44.6%, glycerol-2-monosulfate: 7.5%, glycerol-1,2-disulfate: 8.8%, glycerol-1,3-disulfate: 17%, glycerol-1,2,3-trisulfate: 3.5% (on bases of weight).

Preparation Example 3

Preparation of Sulfated Glycerol [Compound (a) in Example 1-3] (Sulfation Ratio: 1.2)

An aqueous solution of a sulfated glycerol [compound (a) in Example 1-3] (sulfation ratio: 1.2) was prepared by the same method as of Preparation Example 1, except that a reaction molar ratio was [$SO_3$/glycerol]=1.15 (acid value of sulfated product: 374.5 mgKOH/g), and a temperature was 49 to 61° C. The pH of the aqueous solution was 9.7, a volatile matter content was 66.9% by weight, and sodium sulfate was 3.3% by weight. Infrared absorption spectroscopy for nonvolatile matter showed an absorption associated with a sulfate ester bond at 1213 $cm^{-1}$. A composition of the sulfated glycerol was determined from a ratio of integration values of peaks of a proton nuclear magnetic resonance spectrum as follows: glycerol: 9.4%, glycerol-1-monosulfate: 32.9%, glycerol-2-monosulfate: 7.4%, glycerol-1,2-disulfate: 18.9%, glycerol-1,3-disulfate: 20.6%, glycerol-1,2,3-trisulfate: 10.7% (on bases of weight).

Preparation Example 4

Preparation of Sulfated Glycerol [Compound (a) in Example 1-4] (Sulfation Ratio: 1.0)

To 794.5 g of N,N-dimethylformamide (DMF) was added 87.0 g (1.09 mol) of liquid $SO_3$ dropwise with stirring for one hour at 0° C. To this was added 100.0 g (1.09 mol) of glycerol dropwise for 30 minutes. Then, the mixture was raised to 10° C. and stirred for one hour. To the mixture was poured 200.0 g of ion-exchanged water, and neutralized with 142.7 g (1.14 mol) of aqueous solution of 32% by weight sodium hydroxide. N,N-dimethylformamide (DMF) was removed with a rotary evaporator. To this was added further ion-exchanged water to give 881.3 g of aqueous solution of a reaction product [sulfated glycerol [compound (a) in Example 1-4] (sulfation ratio: 1.0)]. The pH of the aqueous solution was 11.1, a volatile matter content (105° C., 2 hours) was 73.6% by weight, and sodium sulfate was 0.3% by weight. Infrared absorption spectroscopy for nonvolatile matter showed an absorption associated with a sulfate ester bond at 1217 $cm^{-1}$. A composition of the sulfated product was determined from a ratio of integration values of peaks of a proton nuclear magnetic resonance spectrum as follows: glycerol: 32.4%, and glycerol-1,2,3-trisulfate: 67.6% (on bases of weight).

Preparation Example 5

Preparation of Sulfated Glycerol [Compound (a) in Example 1-5] (Sulfation Ratio: 2.0)

An aqueous solution of a sulfated glycerol [compound (a) in Example 1-5] (sulfation ratio: 2.0)] was prepared by the same method as of Preparation Example 4, except that 96.7 g (1.21 mol) of liquid $SO_3$, 873.9 g of N,N-dimethylformamide (DMF) and 55.0 g (0.60 mol) of glycerol were used. The pH of the aqueous solution was 11.0, a volatile matter content was 78.7% by weight, and sodium sulfate was 0.6% by weight. Infrared absorption spectroscopy for nonvolatile matter showed an absorption associated with a sulfate ester bond at 1217 $cm^{-1}$. A composition of the sulfated glycerol was determined from a ratio of integration values of peaks of a proton nuclear magnetic resonance spectrum as follows: glycerol: 8.3%, glycerol-1-monosulfate: 5.7%, glycerol-2-monosulfate: 2.1%, glycerol-1,2-disulfate: 3.1%, glycerol-1,3-disulfate: 7.3%, glycerol-1,2,3-trisulfate: 73.4% (on bases of weight).

Preparation Example 6

Preparation of Sulfated Glycerol-EO Adduct (Average Addition Mole Number: 3) [Compound (a) in Examples 1-7 and 1-9] (Sulfation Ratio: 1.0)

(1) Glycerol-EO Adduct (Average Addition Mole Number: 3) (Other Component of Comparative Example 1-6)

In a 2 L autoclave equipped with a stiller, 230.3 g of glycerol and 1.4 g of KOH were stirred at about 600 rpm. The inside of the system was replaced with nitrogen, and then raised to 155° C. To this reaction mixture was added 330.3 g of ethylene oxide (hereinafter, referred to as EO), which amount corresponded to 3 moles of EO per mole of glycerol, under conditions of a pressure of 0.1 to 0.3 MPa (gauge pressure) and a temperature of 155° C. After no decrease of the pressure after introduction of EO had been observed (the end of the reaction), the system was cooled to 80° C. to give a glycerol-EO adduct (average addition mole number: 3) (hydroxy group value: 739.3 mgKOH/g). In this Preparation Example, an EO distribution was as follows: unreacted glycerol (EO=0 mol): 2.9%, EO=1 mol: 11.3%, EO=2 mol: 22.4%, EO=3 mol: 26.1%, EO=4 mol: 19.7%, EO=5 mol: 10.7%, EO=6 mol: 4.6%, EO=7 mol: 1.7%, EO=8 mol: 0.5%, EO=9 mol: 0.2% (on bases of weight).

(2) Sulfated Glycerol-EO Adduct (Average Addition Mole Number: 3) [(Compound (a) in Examples 1-7 and 1-9) (Sulfation Ratio: 1.0)]

An aqueous solution of sulfated glycerol-EO adduct (average addition mole number: 3) [(compound (a) in Examples 1-7 and 1-9) (sulfation ratio: 1.0)] was prepared from the glycerol-EO adduct (average addition mole number: 3) prepared in (1) by the same method as of Preparation Example 1, except that a reaction molar ratio was [SO$_3$/glycerol]=1.0 (acid value of sulfated product: 188.7 mgKOH/g), and a temperature was 42 to 56° C. The pH of the aqueous solution was 11.1, a volatile matter content was 70.0% by weight, and sodium sulfate was 0.1% by weight. Infrared absorption spectroscopy for nonvolatile matter showed an absorption associated with a sulfate ester bond at 1215 cm$^{-1}$.

Preparation Example 7

Preparation of Sulfated Glycerol-EO Adduct (Average Addition Mole Number: 1) (Compound (a) in Examples 1-6) (Sulfation Ratio: 0.9)

(1) Glycerol-EO adduct (Average Addition Mole Number: 1) (Other Component of Comparative Example 1-5)

A glycerol-EO adduct (average addition mole number: 1) was similarly prepared by adding EO to glycerol according to the method of Preparation Example 6-(1). In this Preparation Example, an EO distribution was as follows: unreacted glycerol (EO=0 mol): 36.1%, EO=1 mol: 37.0%, EO=2 mol: 19.1%, EO=3 mol: 6.1%, EO=4 mol: 1.3%, EO=5 mol: 0.2% (on bases of weight).

(2) Sulfated Glycerol-EO Adduct (Average Addition Mole Number: 1) [(Compound (a) in Examples 1-6) (Sulfation Ratio: 0.9)]

An aqueous solution of sulfated glycerol-EO adduct (average addition mole number: 1) [(compound (a) in Examples 1-6) (sulfation ratio: 0.9)] was prepared from the glycerol-EO adduct (average addition mole number: 1) prepared in (1) by the same method as of Preparation Example 1, except that a reaction molar ratio was [SO$_3$/glycerol]=0.9 (acid value of sulfated product: 231.4 mgKOH/g), and a temperature was 49 to 68° C. The pH of the aqueous solution was 8.2, a volatile matter content was 65.9% by weight, and sodium sulfate was 0.6% by weight. Infrared absorption spectroscopy for nonvolatile matter showed an absorption associated with a sulfate ester bond at 1213 cm$^{-1}$.

(1-2) Composition
clinker: 1000 g
gypsum dihydrate: 38.5 g, which corresponded to 1.7% of SO$_3$ being added (1000 g×1.7%/44.13%=38.5 g)
grinding aid: compounds shown in Table 1 as 50% by weight aqueous solutions in additive amounts as shown in Table 1 to 100 parts by weight of hydraulic compound (clinker)

(1-3) Ball Mill

A ball mill used was AXB-15 available from Seiwa Giken Co., Ltd. A volume of a stainless pot was 18 L (outer diameter: 300 mm). Total 140 stainless balls were used, containing 70 balls of 30 mmφ (nominal diameter: 1³⁄₁₆) and 70 balls of 20 mmφ (nominal diameter: ¾). A rotation number of the ball mill was 45 rpm. A time for releasing a ground product during grinding was set to one minute.

(1-4) Time to Reach a Ground State

A target Blaine value was set to 3300±100 cm$^2$/g. Blaine values were measured at 60, 75 and 90 minutes after the start of grinding. Using measured values, a time to reach the target Blaine value 3300 cm$^2$/g was calculated by a quadratic regression equation. The resultant time was considered as an end time of grinding (time to reach a ground state). For measuring a Blaine value, a Blaine air permeability meter defined in JIS R 5201 "Physical testing methods for cement" was used. Difference of times to reach a ground state in this test becomes larger on a practical machine level. Results were evaluated as relative values to a time to reach a ground state of Comparative Example 1-1, which was set to 100. A relative value not more than 90 was considered as "acceptable," and a relative value more than 90 was "not acceptable." In this evaluation, the time to reach a ground state of Comparative Example 1-1 was 124 minutes. In Table 1, the time of Comparative Example 1-1 was shown as "standard."

(1-5) Strength Test

A method was according to Appendix 2 of JIS R 5201 "Physical testing methods for cement" (testing methods for cement-measurement of strength). Cements having a Blaine value of 3300±100 cm$^2$/g prepared above were used. The results were evaluated as relative values to a compressive strength of Comparative Example 1-1, which was set to 100. For strength after three days, the rating of relative values were "A" for more than 120, "B" for more than 110 and not more than 120, and "C" for not more than 110. For strength after seven days, the rating of relative values were "A" for more than 115, "B" for more than 110 and not more than 115, and "C" for not more than 110. In this evaluation, the compressive strength of Comparative Example 1-1 was 29.9 N/mm$^2$ after three days and 44.2 N/mm$^2$ after seven days. In Table 1, the compressive strengths of Comparative Example 1-1 were shown as "standard."

TABLE 1

| | | Compound (a) | | | Other component | | Time to reach ground state | Compressive strength | |
|---|---|---|---|---|---|---|---|---|---|
| | | Component (A) | Mole number of component (B) reacted per mol of hydroxy group of component (A) | Sulfation degree | Amount added to 100 parts by weight of clinker (parts by weight) | Kind | Amount added to 100 parts by weight of clinker (parts by weight) | Time to reach 3300 cm²/g | after 3 days | after 7 days |
| Comparative example | 1-1 | — | — | — | — | — | — | standard | standard | standard |
| | 1-2 | — | — | — | — | Diethylene glycol | 0.04 | acceptable | C | C |
| | 1-3 | — | — | — | — | Glycerol | 0.04 | acceptable | C | C |
| | 1-4 | — | — | — | — | Diglycerol | 0.04 | not acceptable | B | B |
| | 1-5 | — | — | — | — | Glycerol-EO adduct (EOp = 1) | 0.04 | acceptable | B | B |
| | 1-6 | — | — | — | — | Glycerol-EO adduct (EOp = 3) | 0.04 | acceptable | C | C |
| Example | 1-1 | Diethylene glycol | 0.50 | 1.0 | 0.04 | — | — | acceptable | B | B |
| | 1-2 | Glycerol | 0.30 | 0.9 | 0.04 | — | — | acceptable | A | A |
| | 1-3 | Glycerol | 0.40 | 1.2 | 0.04 | — | — | acceptable | B | B |
| | 1-4 | Glycerol | 0.33 | 1.0 | 0.04 | — | — | acceptable | B | B |
| | 1-5 | Glycerol | 0.67 | 2.0 | 0.04 | — | — | acceptable | B | B |
| | 1-6 | Glycerol-EO adduct (EOp = 1) | 0.30 | 0.9 | 0.04 | — | — | acceptable | A | A |
| | 1-7 | Glycerol-EO adduct (EOp = 3) | 0.33 | 1.0 | 0.04 | — | — | acceptable | B | B |
| | 1-8 | Glycerol | 0.30 | 0.9 | 0.028 | Glycerol | 0.012 | acceptable | B | B |
| | 1-9 | Glycerol-EO adduct (EOp = 3) | 0.33 | 1.0 | 0.028 | Glycerol | 0.012 | acceptable | B | B |

In Table 1, EOp is an average addition mole number of ethylene oxide. Comparative Example 1-1 was conducted by adding only water in an amount of 0.04% by weight based on clinker weight.

Example 1-1 and Comparative Example 1-2, Examples 1-2 to 1-5 and Comparative Example 1-3, Example 1-6 and Comparative Example 1-5, and Example 1-7 and Comparative Example 1-6 each were in a relationship of a sulfated compound (Example compound) and a polyhydric alcohol or an alkylene oxide adduct of a polyhydric alcohol (Comparative Example compound) before sulfation. Comparison between compounds having the relationship shows that the sulfation increases a compressive strength.

The invention claimed is:

1. A method for producing a hydraulic powder, comprising grinding a hydraulic compound in the presence of a compound (a) prepared by reacting component (A) of at least one compound selected from the group consisting of polyhydric alcohols and an alkylene oxide adduct to a polyhydric alcohol with a sulfating agent (B), wherein
   the compound (a) is prepared by reacting component (A) with the sulfating agent (B) in an average amount of 0.1 to 1.0 mol per mole of hydroxy group of component (A), and
   the component (A) is at least one compound selected from the group consisting of diethylene glycol, glycerol, an ethylene oxide adduct to glycerol and a propylene oxide adduct to glycerol.

2. The method according to claim 1, wherein the compound (a) is used in an amount of 0.001 to 0.2 part by weight to 100 parts by weight of the hydraulic compound.

3. A hydraulic powder, produced by the method according to claim 1.

* * * * *